United States Patent

Stover

[11] Patent Number: 6,036,862
[45] Date of Patent: Mar. 14, 2000

[54] BIOCHEMICALLY ENCHANCED THERMOPHILIC TREATMENT PROCESS

[76] Inventor: Enos L. Stover, P.O. Box 2056, Stillwater, Okla. 74076

[21] Appl. No.: 09/134,557

[22] Filed: Aug. 14, 1998

Related U.S. Application Data

[60] Provisional application No. 60/071,943, Jan. 20, 1998.

[51] Int. Cl.$^7$ ...................................................... C02F 3/12
[52] U.S. Cl. ........................ 210/603; 210/614; 210/620; 210/612
[58] Field of Search ..................................... 210/603, 610, 210/612, 613, 614, 620, 622, 629, 194, 195.1, 220, 143, 149

[56] References Cited

U.S. PATENT DOCUMENTS

| | | | |
|---|---|---|---|
| 3,772,187 | 11/1973 | Othmer | 210/622 |
| 3,961,078 | 6/1976 | Still | 210/612 |
| 4,062,770 | 12/1977 | Kneer | 210/614 |
| 4,163,712 | 8/1979 | Smith | 210/622 |
| 4,276,174 | 6/1981 | Breider et al. | 210/614 |
| 4,277,342 | 7/1981 | Hayes et al. | 210/614 |
| 4,548,715 | 10/1985 | Stein | 210/614 |
| 5,013,442 | 5/1991 | Davis et al. | 210/614 |
| 5,463,176 | 10/1995 | Eckert | 210/622 |
| 5,587,081 | 12/1996 | Norcross et al. | 210/612 |
| 5,733,456 | 3/1998 | Okey et al. | 210/614 |

FOREIGN PATENT DOCUMENTS 4-7095   1/1992   Japan .

*Primary Examiner*—Christopher Upton
*Attorney, Agent, or Firm*—Crowe & Dunlevy; Bill D. McCarty; Phillip L. Free, Jr.

[57] ABSTRACT

The present invention provides a process and apparatus for autothermal aerobic thermophilic treatment of high strength and high temperature wastes. In accordance with the process of the present invention, waste material is injected into a reactor vessel having thermophilic microorganisms to form a volume of bulk liquid in the reactor vessel. An oxygen-containing gas is also injected into the reactor vessel in such manner as to transfer oxygen into the reactor bulk liquid for utilization by the thermophilic microorganisms in aerobic treatment of the waste material. The oxidation-reduction potential and temperature of the reactor bulk liquid are monitored and at least a selected one of the rate of injection of the oxygen-containing gas, the oxygen-transfer efficiency of the oxygen-containing gas and the volume of bulk liquid in the reactor are adjusted in response to the oxidation-reduction potential and temperature of the reactor bulk liquid to maintain the temperature of the reactor bulk liquid within a predetermined range. This allows the system to match the oxygen transfer to the oxygen demand for the system. In particularly preferred embodiments, other parameters such as pH, COD, TS, VS, VFAs, $NH_3$—N, $PO_4$—P, alkalinity and sulfides in the reactor bulk liquid, as well as $O_2$, $CO_2$, and $H_2S$ in the offgas are monitored to provide further process information for optimization of the aerobic, thermophilic treatment process. Biological kinetic relationships developed by the inventor, and specific formulations of biological growth micronutrients are utilized for further enhancing the aerobic thermophilic treatment process.

6 Claims, 2 Drawing Sheets

BIOCHEMICALLY ENCHANCED THERMOPHILIC TREATMENT PROCESS

RELATED APPLICATIONS

This application claims the benefit of Provisional Application No. 60/071,943 entitled Biochemically Enhanced Thermophilic Treatment Process, filed Jan. 20, 1998.

FIELD OF THE INVENTION

The present invention relates generally to biological processing of waste material and, more particularly, but not by way of limitation, to an aerobic thermophilic treatment process for treating high temperature or high strength wastes in various forms.

BACKGROUND OF THE INVENTION

Numerous processes have been developed over the years for biological treatment of domestic and industrial wastewater and sludge. These biological treatment processes include both aerobic and anaerobic treatment processes which use biologically active microorganisms (or "biomass") to convert various soluble contaminants, especially organic contaminants, into a form which can be separated from the wastewater. Insoluble organic contaminants are digested by such processes to produce a reduced quantity of a known biomass.

Although such biological treatment processes yield purified water, they also yield a net positive production of biological solids which contribute to the biomass used for the process. Consequently, a portion of the biomass (or sludge) must be periodically removed for further treatment or disposal. There are significant costs associated with further treatment of the biomass produced, and there are numerous regulations and significant costs associated with disposal of the biomass. Thus, in recent years, much attention has been focused on minimizing the amount of biomass produced during the biological treatment process.

In the mesophilic temperature range, about 50° F. to 110° F., the new bacteria generated as a result of the anaerobic treatment process is only approximately 10 to 20 percent of that produced as a result of the aerobic treatment process. Furthermore, because methane from the biogas produced during anaerobic treatment can be burned to provide heat to the system, the energy requirement for the anaerobic process is only about 10 to 20 percent of that for the aerobic process at the same temperature. A substantial drawback to the anaerobic treatment process, however, is that it produces a biogas which consists primarily of methane ($CH_4$), carbon dioxide ($CO_2$) and hydrogen sulfide ($H_2S$). The $H_2S$ in the biogas can cause severe odor problems and biological toxicity. Hydrogen Sulfide is an extremely corrosive gas and can be lethal in high concentrations. With the increasingly stringent federal regulations governing this area, the anaerobic treatment process is becoming less and less desirable for many waste treatment applications.

As an alternative, aerobic treatment processes in the thermophilic temperature range, about 115° F. to 170° F., produce only about 10 to 20 percent of the biomass generated from the aerobic process in the mesophilic range. Additionally, the offgas produced from aerobic treatment primarily comprises carbon dioxide ($CO_2$), with essentially no hydrogen sulfide ($H_2S$) production. Thus, aerobic thermophilic processes yield reduced biomass production comparable to mesophilic anaerobic processes, but without the associated noxious and odorous biogas.

Both soluble wastewater constituents and particulate or suspended solid matter, such as waste biological sludges, can be used as a food or fuel source for the thermophilic microorganisms. Solid matter first has to be biochemically hydrolyzed to soluble constituents and transported across the thermophilic microorganism cell wall before it can be used as a food or fuel source by the microorganisms. The food or fuel value of the waste material is best measured as chemical oxygen demand (COD) or volatile solids (VS).

The COD can be measured or calculated. The calculated or theoretical COD represents the stoichiometric amount of oxygen which would be required to chemically oxidize all of the food, fuel, or organic matter in the waste material to carbon dioxide and water. The COD value can be calculated when the composite empirical formula for the waste materials being oxidized is known along with their relative concentrations. Otherwise, the COD can be measured by a standard COD test methodology used to oxidize all the organic matter to carbon dioxide and water, whereby the associated oxygen equivalents are measured. Likewise, the volatile solids content of a waste can be measured by a standard solids test methodology, whereby the solids are burned in a furnace for gravimetric determination of the amount of solids volatilized or lost. Either the COD, VS, or both can be effectively utilized to measure the amount of substrate, food source, fuel, or organic matter available in the waste for utilization by the thermophilic bacteria for growth, energy production, heat production, and cell maintenance.

As noted, the aerobic thermophilic treatment process generates heat and is, therefore, an exothermic process. Thus, if the waste to be treated is sufficiently concentrated with organic compounds to serve as food for the thermophilic bacteria in the reaction processes, the reaction process will be autothermal, i.e., the reaction will supply enough heat to maintain the temperature at the desired level within the thermophilic range. Even if the waste is not a "high strength" waste, the reaction can also be autothermal if the temperature of the waste is sufficiently high.

Although high strength and high temperature wastes can, in theory, yield an autothermal thermophilic process, in practice the prior art methods have been unable to achieve this result in a commercially practicable process. The primary problem arises from the air that is injected into the reactor to provide the oxygen necessary to react with the thermophilic bacteria. The air utilized for such processes is normally compressed air which has been obtained from the ambient air surrounding the treatment facility. This air is normally not 100% humidified and may have a temperature which is relatively low compared to the desired thermophilic temperature of the sludge. Consequently, as the air rises through the liquid in the reaction vessel it will be humidified and heated. As the air exits the reaction vessel, heat is lost from the system and the temperature of the system is lowered. Thus, prior art methods have required addition of heat to the process from an external source, increasing significantly the cost associated with the treatment process.

Heightening the problem is the fact that in prior art processes only a portion of the oxygen available from the injected air will actually be transferred to the thermophilic microorganisms to supply the oxygen demand required for aerobic treatment. Thus, as more air must be passed through the reaction liquid to meet the oxygen demand because of poor oxygen transfer, more heat is lost in the offgas, and the temperature of the system will not support autothermal conditions. By contrast, if too little air is passed through the system, there will not be enough oxygen transferred to the thermophilic microorganisms for aerobic treatment of the waste, and the process will turn anaerobic with all of the associated disadvantages.

Thus, there continues to be a need for a process for aerobic thermophilic treatment of wastewater and sludge. The process should be autothermal and should match the oxygen transfer to the oxygen demand.

SUMMARY OF THE INVENTION

The present invention provides an improved process and apparatus for aerobic thermophilic biological treatment of wastes in various forms. The improved aerobic thermophilic process utilizes specific parameter monitoring to optimize and control the treatment process.

In accordance with one embodiment of the invention, a process is provided for the aerobic thermophilic treatment of waste, including injecting waste material into a reactor vessel having thermophilic microorganisms to form a volume of bulk liquid in the reactor vessel, injecting an oxygen-containing gas into the reactor vessel in such manner as to transfer oxygen into the reactor bulk liquid for utilization by the thermophilic microorganisms in aerobic treatment of the waste material, monitoring the oxidation-reduction potential and temperature of the reactor bulk liquid; and adjusting at least a selected one of the rate of injection of the oxygen-containing gas, the oxygen-transfer efficiency of the oxygen-containing gas and the volume of bulk liquid in the reactor in response to the oxidation-reduction potential and temperature of the reactor bulk liquid to maintain the temperature of the reactor bulk liquid within a predetermined range. In particularly preferred embodiments, other parameters such as pH, COD, TS, VS, VFAs, $NH_3$—N, $PO_4$—P, alkalinity and sulfides in the reactor bulk liquid, as well as $O_2$, $CO_2$, and $H_2S$ in the offgas are monitored to provide further process information for optimization of the aerobic, thermophilic treatment process. Biological kinetic relationships developed by the inventor, and specific formulations of biological growth micronutrients are utilized for further enhancing the aerobic thermophilic treatment process.

Similarly, the apparatus of the present invention includes means for injecting an influent mixture into a reactor vessel having thermophilic microorganisms to form a volume of bulk liquid in the reactor vessel, wherein the influent mixture comprises an oxygen-containing gas, waste material and recycled effluent, means for monitoring the oxidation-reduction potential and temperature of the reactor bulk liquid, and means for adjusting at least a selected one of the rate of injection of the oxygen-containing gas, the rate of injection of the recycled effluent and the volume of the bulk liquid in response to the oxidation-reduction potential and temperature of the reactor bulk liquid to maintain the temperature of the reactor bulk liquid within a predetermined range.

These and various other features as well as advantages which characterize the present invention will be apparent from a reading of the following detailed description and a review of the associated drawings.

DETAILED DESCRIPTION

The present invention provides an improved process and apparatus for aerobic thermophilic biological treatment of high temperature or high strength wastes in various forms (e.g., soluble, slurry, particulate/solid or combination forms). The improved aerobic thermophilic process utilizes specific parameter monitoring to optimize and control the treatment process. Preferably, parameters are monitored in both the reactor bulk liquid and the offgas or biogas produced. Biological kinetic relationships developed by the inventor, and specific formulations of biological growth micronutrients are utilized for further enhancing the aerobic thermophilic treatment process.

Figure 1:
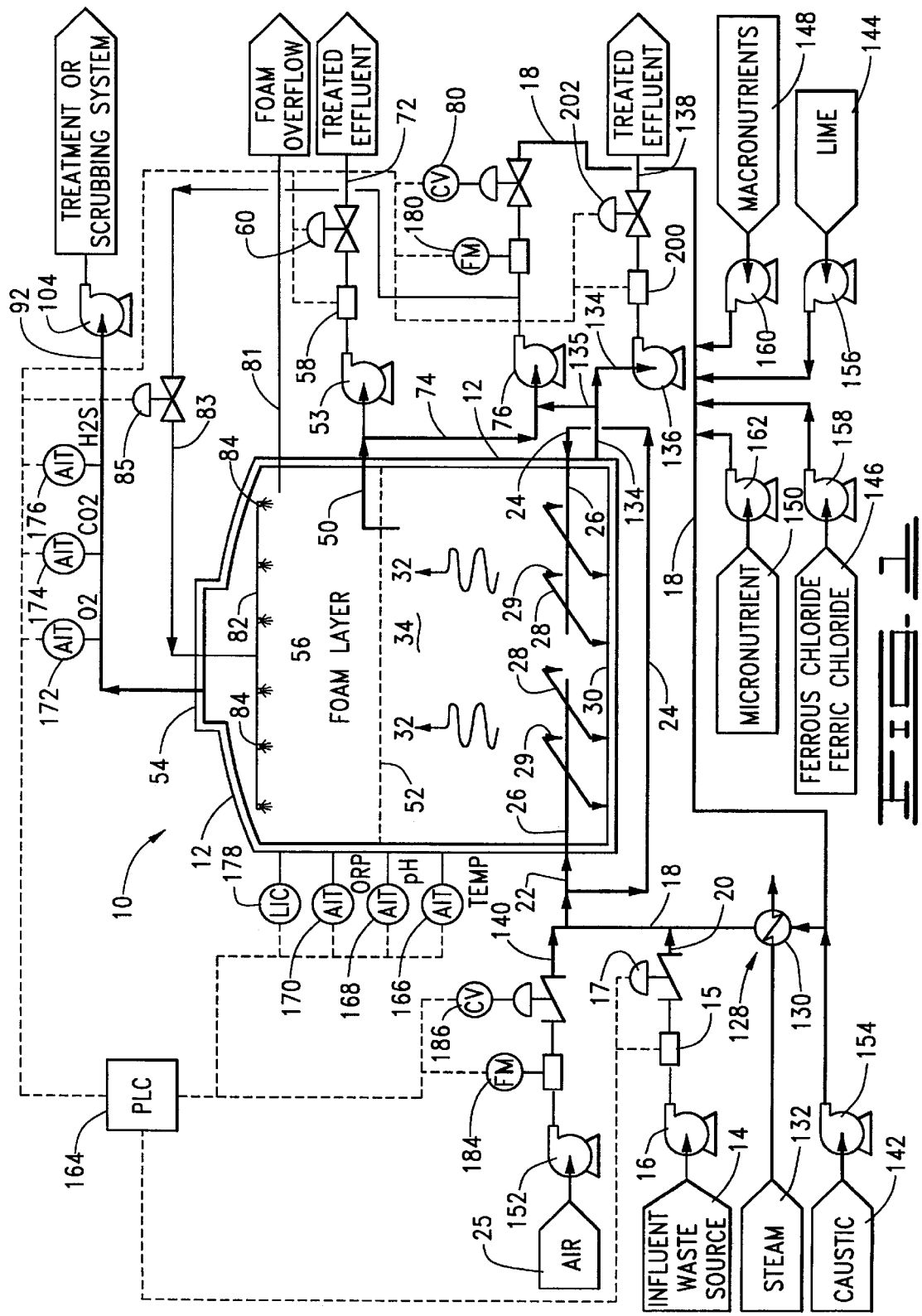
FIG. 1 is a schematic diagram of the preferred embodiment of the reactor vessel of the present invention useful for practicing the biochemically enhanced thermophilic treatment process of the present invention.

Illustrated in FIG. 1 is an aerobic thermophilic reactor for treating high temperature or high strength wastes according to the process of the present invention. The aerobic thermophilic reactor of the present invention is generally designated by the reference numeral 10 and includes reactor vessel 12 having a bottom floor 30 and a roof 54. An influent waste source 14 designates the waste material to be treated by the process, which may be any soluble, slurry, or solid waste, or various combinations thereof, having organic and/or other contaminants particularly suitable for thermophilic treatment as further described herein. The waste material is pumped to the aerobic thermophilic reactor 10 by an influent waste pumping system 16 through conduits 20, 22, and 24 for ultimate mixing with the reactor contents (or "bulk liquid") of reactor vessel 12. To regulate the flow of waste material to the reactor vessel 12, a flow meter 15 and control valve 17 are provided in conduit 20. Alternatively, the flow of influent waste material can be regulated by using a variable speed pump (not shown) for the waste pumping system 16. A liquid level sensor 178 monitors the level of the bulk liquid in the reactor vessel 12.

Increased flow is provided to conduits 20, 22, and 24 for mixing purposes by recycling a stream of reactor effluent through recycle line 18 to conduits 20, 22, and 24. Oxygen is provided for the aerobic process from an air source 25 or such other oxygen containing gas source. The flow of air (or other oxygen containing gas) is generated by a blower 152 and regulated by a flow meter 184 and a flow control valve 186. Alternatively, the flow of air can be regulated by using a variable speed blower (not shown) to generate the flow of air. The air travels through conduit 140 to conduit 20 where it is added to the influent waste material and recycled effluent in conduit 20 to form an influent mixture in conduits 22, 24 as it is conveyed to the reactor vessel 12 for mixing with the reactor bulk liquid.

Figure 2:
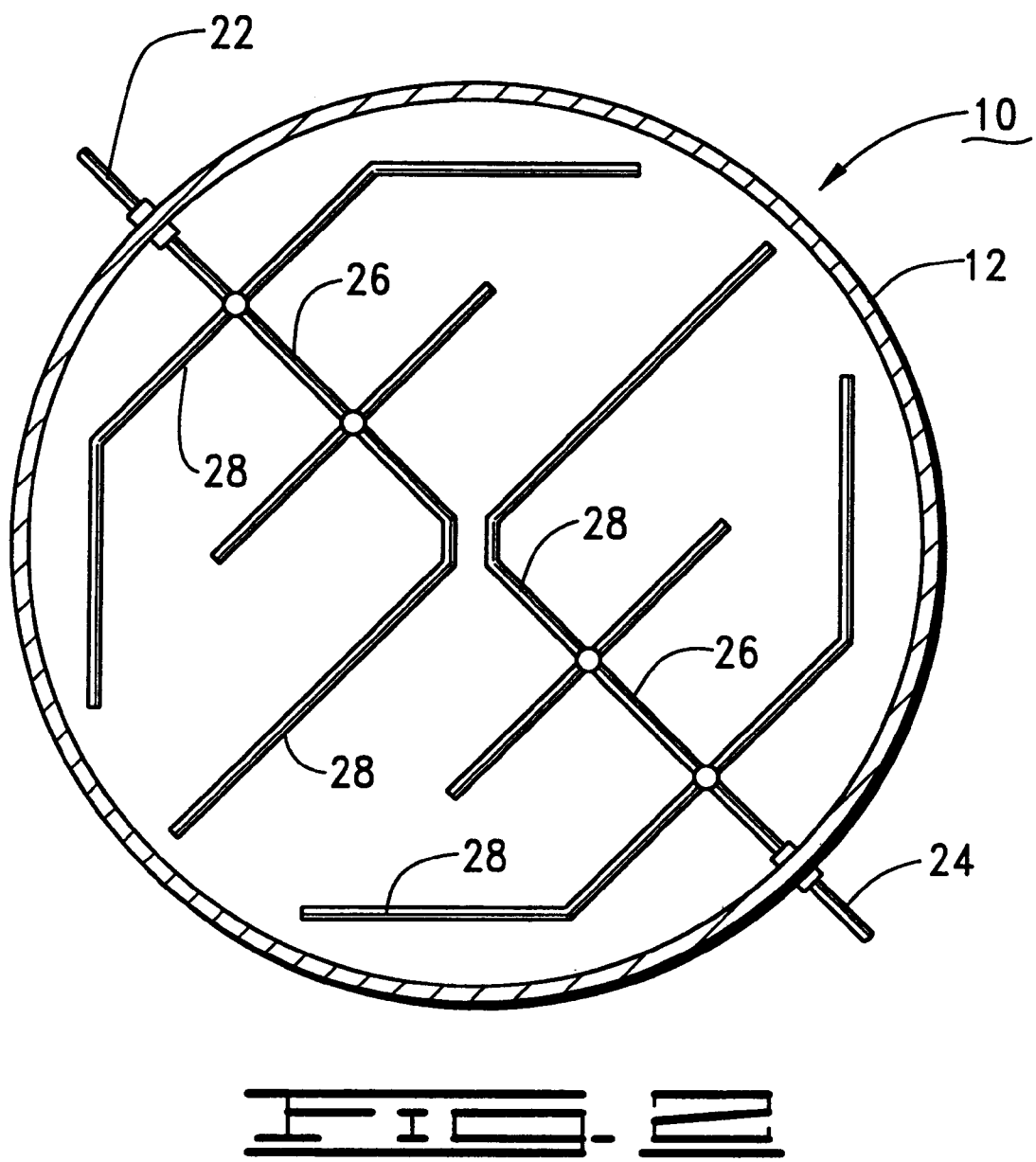
FIG. 2 is a horizontal cross-sectional view taken at the bottom of the reactor vessel containing one possible arrangement for the influent distributor piping associated therewith.

Referring now to FIGS. 1 and 2, the influent mixture in conduits 22, 24 is distributed by a system of influent distributor pipes 26, 28 along the reactor floor so as to evenly distribute the flow of influent mixture across the entire area of the reactor vessel 12. The influent distributor pipes 26, 28 contain orifices or nozzles 29 at intervals along their length which results in the influent mixture exiting the distributor pipes 26, 28 at high velocity, thereby imparting high oxygen transfer efficiency and mixing energy to the reactor bulk liquid to prevent settling of the biological solids within the reactor vessel 12. The influent distributor pipes 26, 28 are valved (not shown) to allow isolation of areas of the distributor pipes 26, 28 to force all of the influent mixture flow through a portion of the distributor pipes 26, 28 to help prevent the accumulation of deposits in the distributor pipes 26, 28 and orifices or nozzles 29 and to agitate the reactor vessel 12 to prevent packing of sludge on the bottom floor 30 of the reactor vessel 12. Further details of construction as to this and perhaps other aspects of the present invention can be determined from a reading of the inventor's prior patent, U.S. Pat. No. 5,228,995, which is incorporated herein by reference.

Upon entering the reactor vessel 12, the influent mixture assumes a vertical flow path 32 and mixes with thermophilic biological solids in a suspended growth zone 34. The upward flow path 32 of the air, influent waste and recycled effluent of the influent mixture serves to maintain the biological solids in suspension in the suspended growth zone 34.

Offgas is withdrawn from the reactor vessel 12 through the headspace area 56 above the liquid line 52 and below the roof 54 of the reactor vessel 12 under negative pressure supplied by offgas blower 104. The reactor vessel 12 is air-tight to prevent unwanted air from entering the reactor vessel 12 and to allow the offgas blower 104 to create a negative pressure in the headspace area 56.

The aerobic thermophilic reactor 10 can be operated in a constant volume or variable volume mode. In the constant volume (or liquid level) mode, treated effluent is withdrawn from the reactor vessel 12 though an upper effluent withdrawal line 50 by gravity or an upper effluent pump 53. When using upper effluent pump 53, the amount of treated effluent leaving the aerobic thermophilic reactor 10 through conduit 72 is regulated by an effluent flow meter 58 and an effluent flow control valve 60. As noted above, a portion of the treated effluent is split from the upper effluent withdrawal line 50 via line 74 for recycling through recycle line 18 and the influent conduits 20, 22, 24 to the reactor vessel 12. Flow for the recycle stream is provided by a recycle pump 76 and a recycle flow meter 180 and recycle flow control valve 80 to regulate the flow rate for the recycle stream through recycle line 18. The flow rate for the recycle stream is designed to provide the optimum hydraulic throughput rate to maintain adequate and effective mixing intensity, efficient oxygen transfer, and suspension of the biological solids in the suspended growth zone 34. The recycle pump 76 typically includes two or more pumps (not separately designated) to allow flexibility in operation.

In the variable volume (or variable liquid level) mode, the recycle effluent and treated effluent are removed from the reactor vessel 12 through a lower effluent withdrawal line 134 by lower effluent pump 136 and the treated effluent is discharged through line 138. The flow rate for the treated effluent discharged through line 138 is regulated by effluent flow meter 200 and effluent control valve 202. A portion of the treated effluent is split from line 134 to line 135 and pumped by recycle pump 76 for recycle through line 18, as described above.

It is characteristic of thermophilic treatment reactors which operate at high temperatures that as the offgas rises to the top of the reactor vessel 12 into headspace area 56, some solids are also carried to the surface of the liquid line 52 contributing to form a foam/scum layer which provides a layer of insulation for the aerobic treatment process. Control of this characteristic foam/scum layer is necessary to ensure optimal performance of the aerobic thermophilic reactor 10. To control the foam/scum layer, the aerobic thermophilic reactor 10 is equipped with a foam/scum overflow line 81 which serves to set the maximum height of the foam/scum layer. The foam/scum is conveyed to either a foam/scum collection chamber or may be combined with the treated effluent.

Preferably, the aerobic thermophilic reactor 10, is also provided with a foam spray control system 82 which utilizes a portion of the internal recycle flow on conduit 83 for antifoam spray water. The spray water is applied as a coarse spray water onto the foam/scum surface to break up the foam/scum by a number of spray nozzles 84 located near the roof 54 of the reactor vessel 12. Control of the spray water through conduit 83 is provided by control valve 85.

Offgas generated by the aerobic thermophilic treatment process is withdrawn from the reactor vessel 12 by the offgas blower 104 via the offgas removal line 92. The offgas blower 104 is used to convey the offgas to an appropriate treatment or scrubbing system or to a recycle/reuse application in a liquid processing wastewater treatment plant for reuse of the ammonia-nitrogen nutrient generated from sludge processing.

In accordance with the present invention, optimization of the aerobic thermophilic treatment process is achieved by monitoring and controlling the temperature, pH and ORP of the reactor bulk liquid to maintain these critical parameters within appropriate ranges. Thus, a temperature sensor 166, a pH sensor 168 and an ORP sensor 170 are provided to monitor these critical parameters of the bulk liquid.

A pH range of 6.5 to 9.0 is needed for effective operation of the aerobic thermophilic reactor 10. Since most high strength wastes are acidic, and alkalinity is consumed during treatment, it is normally necessary to supplement the wastewater with alkalinity in order to maintain a proper operating pH range in the reactor vessel 12. An exception is waste biological sludge which produces excess alkalinity in the form of ammonium bicarbonate alkalinity during thermophilic digestion or treatment. No pH adjustment is made to the influent waste before mixing with the recycle stream in order to make beneficial use of the alkalinity and buffering capacity of the recycle stream. Sodium hydroxide NaOH or calcium hydroxide $Ca(OH)_2$ are added from a caustic source 142 using a variable speed pump 154 as needed for alkalinity addition for final pH control. The pH sensor 168 is thus provided to monitor the pH inside the reactor vessel 12 so that the pH can be maintained within the predetermined set point range.

As noted above, in the process of the present invention it is important to match the oxygen transfer to the oxygen demand. However, because bulk liquid dissolved oxygen (D. O.) levels are so low (0.1 to 0.5 mg/l) and the dissolved oxygen uptake rates (DOURs) are so high (normally 200 to 500 mg/l/hr.) in aerobic thermophilic systems, it is impossible to accurately measure the D.O. level in the reactor vessel 12. Thus, the present invention uses ORP as an indicator of the D. O. level of the reactor bulk liquid and the ORP sensor 170 is the means for monitoring this parameter. The desired ORP for any given system will vary depending upon factors such as the characteristics of the waste material to be treated, the reactor design, etc. However, in many reactors the preferred operating range for the ORP will be from about −300 mV to about 0 mV.

Temperature is another critical parameter in the process of the present invention. It is important that the temperature of the reactor bulk liquid remain within the thermophilic temperature range (115° to 170° F.) and preferably within the optimum temperature range of 135° to 145° F. for the process to remain autothermal or self-heating. Temperature sensor 166 allows monitoring of the temperature of the reactor bulk liquid so that this parameter can also be maintained within the set point range, preferably at the upper end of the preferred thermophilic temperature range.

As shown in FIG. 1, a supplemental heating system 128, consisting of a steam source 132 and injector valve or heat exchanger 130, can also be provided to heat the influent flow or recycle line 18 in the event the heating requirements of the aerobic thermophilic reactor 10 cannot be satisfied by the fuel value content or the temperature of the raw waste to be treated. Such a supplemental heating system allows the reactor bulk liquid temperature to be maintained within the desired temperature range.

The temperature sensor 166 and ORP sensor 170 are provided to monitor these primary parameters of the bulk liquid in order to effectively match the oxygen transfer to the oxygen demand. If the temperature or ORP are outside the respective set point ranges, the system is optimized by adjusting the flow rates of the recycle effluent and air using flow control valves 80, 186.

In highly preferred embodiments, secondary parameters are also monitored to give further information as to the state of the reaction process taking place in the reactor vessel 12. An oxygen sensor 172, a carbon dioxide sensor 174 and a hydrogen sulfide sensor 176 are provided in the offgas removal line 92 for monitoring the levels of each of these gases. While preferred ranges for each of these parameters may vary, in many waste treatment applications oxygen in the offgas will preferably be in the range of 10 to 15 percent and hydrogen sulfide will preferably be less than 10 parts per million. The carbon dioxide concentration in the offgas will be plant specific. Furthermore, volatile fatty acid (VFAs) and sulfide concentrations in the reactor bulk liquid are monitored using wet chemistry analysis of samples taken from the reactor bulk liquid. In many waste treatment plants, the preferred range for VFAs will be less than about 1500 mg/L and the preferred range for sulfides will be less than about 1.0 mg/L. Each of these parameters provides further information as to the state of the aerobic treatment process and the adjustments needed to the flow rates of the recycle effluent and air in order to maintain the process as both aerobic and thermophilic.

The oxygen sensor 172 determines the concentration of oxygen in the offgas and gives an indication of the oxygen which is passing through the system without being utilized for the reaction processes taking place in the bulk liquid. The carbon dioxide sensor 174 determines the level of carbon dioxide in the offgas and can be used to determine the amount of carbon dioxide generated as offgas.

Table one summarizes, typical preferred ranges for the primary and secondary process parameter.

TABLE 1

| Parameter | Preferred Range |
| --- | --- |
| Temperature, T | 135° F. to 145° F. |
| Oxidation Reduction Potential, ORP | −300 mV to 0 mV |
| pH | 6.5 to 9.0 |
| Volatile Fatty Acids, VFAs | <1,500 mg/L |
| Sulfides | <1.0 mg/L |
| Oxygen, $O_2$ (in the offgas) | about 10 to 15% |
| Hydrogen Sulfide, $H_2S$ (in the offgas) | <10 ppm |
| Carbon Dioxide, $CO_2$ (in the offgas) | Plant Specific |

If the ORP is allowed to reduce enough to allow anaerobic bacteria to thrive, sulfides can be produced from wastes containing sulfates and/or organic sulfur containing compounds. This will yield sulfides in the bulk liquid. Hydrogen sulfide ($H_2S$) is partially soluble and insoluble, and as the $H_2S$ is produced above its solubility level, it diffuses out of solution and into the offgas. This is a normal aspect of anaerobic systems and the amount of sulfides in the bulk liquid and $H_2S$ in the biogas must be monitored and controlled to achieve maximum treatment performance. The sulfides level in the reactor bulk liquid is determined using wet chemistry techniques, while the $H_2S$ level in the offgas is determined using the $H_2S$ sensor 176.

At the very low D. O. and ORP levels associated with the aerobic thermophilic process of the present invention, fermentation reactions will exist with some VFA formation. As the D. O. and ORP levels decline, VFAs produced from fermentation reactions will increase. VFA formation, if allowed to accumulate to high levels in the reactor, can cause biological feedback inhibition and reduced treatment performance. In accordance with the present process, VFAs are conveniently monitored using wet chemistry techniques.

Thus, monitoring oxygen, carbon dioxide and hydrogen sulfide in the offgas, as well as VFAs and sulfides in the reactor bulk liquid in accordance with the process of the present invention provides further information as to the conditions in the reactor vessel 12. Such information, in combination with the bulk liquid ORP, is used to insure an appropriate oxidizing environment in the aerobic thermophilic reactor 10.

Besides the chemical feed system for the caustic source 142, four other chemical feed systems are provided to provide sources of other chemicals necessary to optimize the treatment process. Variable speed pumps 154, 156, 158, 160, 162 control the rates of the respective sources 142, 144, 146, 148, 150 which are supplied to the recycle line 18. A lime source 144 provides alkalinity and calcium as a micronutrient. A ferrous chloride ($FeCl_3$) and/or ferric chloride ($FeCl_2$) source is provided to provide these chemicals as micronutrients, for odor control, and for sulfide complexation, if needed. Either $FeCl_3$ or $FeCl_2$ can be used for sulfide control by complexing or precipitating sulfides as they are formed in the reactor. However, sulfate reduction to sulfides is primarily controlled by controlling the ORP, and thus the oxygen, in the reactor vessel 12.

A macronutrients (nitrogen and phosphorus) source 148 and a micronutrients (trace metals) source 150 are provided because such nutrients are critical to successful performance of thermophilic treatment systems, especially when treating nutrient deficient wastes. The levels of the macronutrients nitrogen and phosphorus are normally inadequate in high strength industrial wastes. Aqueous ammonia and phosphoric acid can be used to supply nitrogen and phosphorus, as well as various forms of fertilizers. The micronutrient source 150 provides the following primary chemicals necessary for growth requirements:

Ferric chloride/ferrous chloride;
Calcium chloride;
Ammonium molybdate;
Nickel chloride;
Copper sulfate;
Cobalt chloride; and
Zinc sulfate.

The trace metals are critical in controlling the rate of enzyme reactions which set the rate of biological activity. Trace metals also serve as regulators of osmotic pressure and to transfer electrons in oxidation-reduction reactions such as the storage of energy, i.e., the conversion of ADP to ATP. The major trace elements required by bacteria include iron, magnesium, calcium, copper, zinc, nickel, cobalt, molybdenum, selenium and tungsten. Any of these micronutrients can be added to the reactor vessel 12 in low concentrations, as necessary to stimulate the thermophilic bacteria.

In highly preferred embodiments, the various monitor and control elements of the aerobic thermophilic reactor 10 are regulated automatically by means of a PLC 164, which includes a computer linked to the various monitoring and control elements, as shown in FIG. 1.

As noted above, the most effective indicators of thermophilic reactor performance are bulk liquid temperature, pH, ORP, VFA's, and sulfides, along with offgas or biogas oxygen, carbon dioxide, methane, and $H_2S$ content. Additionally, though, alkalinity, COD, TS, VS, $NH_3$—N, PO4—P and micronutrients can be monitored in the bulk liquid to provide still further process information. Each of these parameters should be kept within desired operating ranges which are plant specific in nature. An understanding of the interrelationships and interdependence of all these parameters, along with proper monitoring and control is required for successful start-up and operation of aerobic thermophilic reactor 10. From the following discussion, the significance of each of these parameters will be apparent to those skilled in the art.

One aspect of thermophilic treatment of waste biological sludges is the release of organically bound nitrogen as $NH_3$—N. Actual nitrogen measurement in waste biological sludges indicate nitrogen contents from between about 7.0 to 12.0% by weight. Therefore proteinaceous wastes, like biological sludges, generate excess nitrogen in the ammonia form which reacts with the excess $CO_2$ in the reactor bulk liquid to reduce the amount of free bulk liquid $CO_2$ and headspace $CO_2$ partial pressure by producing ammonium bicarbonate alkalinity ($NH_4 HCO_3$). A significant portion of the $CO_2$ that is produced from the biological activity does not replace oxygen in the gas phase, but instead the $CO_2$ reacts with the ammonia and remains in the aqueous phase (bulk liquid). For each mg/l of $NH_3$-N formed, 5.6 mg/l of $NH_4 HCO_3$ alkalinity is formed, which is equivalent to 3.6 mg/l of calcium carbonate ($CaCO_3$) alkalinity. The ammonium bicarbonate alkalinity causes the reactor bulk liquid pH to increase; with highly proteinaceous wastes the pH typically increases to the 8.0 to 9.0 pH range. At these high bulk liquid pH levels and the high temperatures associated with the thermophilic process a portion of the $NH_3$—N formed will be volatilized or released into the reactor offgases. When the thermophilic system offgases are treated by absorption back into biological liquid treatment systems (for example activated sludge systems) the $NH_3$—N released in the offgases is captured for recycle/reuse for new biological growth. High concentrations of $NH_3$—N, $PO_4$—P, and micronutrients released into the thermophilic reactor bulk liquid when treating waste biological sludges can also be recycled and reused back in the wastewater biological treatment process for synthesis of new biological cells (waste sludge). When the thermophilic waste sludge is dewatered, the filtrate is recycled back to the mesophilic biological treatment process.

Proper sizing and evaluation of aeration equipment for the transfer of the required amount of oxygen into the aerobic thermophilic reactor requires determination of the oxygen utilization (uptake) requirements and an understanding of the interfacial resistances to oxygen transfer and the oxygen solution characteristics of the waste matrix to be treated. Increasing or decreasing the air or oxygen flow rate into the reactor affects the oxygen transfer rate, type of and rate of biochemical reactions, heat loss and temperature, and nature of and degree of foaming. It is, therefore, very critical to match the air or oxygen flow rate and oxygen transfer efficiency with the oxygen utilization rate in the aerobic thermophilic reactor design and operations. Since it is practically impossible to measure the DOUR's at such high rates and low bulk liquid D. O.'s, an alternative approach must be used to estimate the required oxygen utilization rates.

In accordance with the present invention, a more readily facilitated method for determining the oxygen utilization requirements for any specific waste is to perform a stoichiometric energy balance, in which all components of the balance are expressed in terms of oxygen, i.e., as COD and oxygen uptake. If a certain amount of oxygen is required to completely oxidize the organic matter in the waste (soluble or particulate), and only part of it is oxidized, then the remaining COD should be equal to the original COD minus the oxygen equivalent that has been expressed as oxygen uptake, as shown:

$$COD_W + COD_S \rightarrow O_2\ \text{uptake} + COD_E + COD_{FS} \quad (1)$$

where:

$COD_W$=Waste COD $COD_{IS}$=Initial Biological Solids COD $COD_E$=Effluent COD $COD_{FS}$=Final Biological Solids COD Since $COD_W$-$COD_E$ represents the delta change in COD due to treatment ($\Delta COD$), and $COD_{FS}$-$COD_{IS}$ represents the increase in biological solids expressed as COD, or $\Delta COD$ (biological solids), Equation 1 can be written, as shown:

$$\Delta COD = O_2\ \text{uptake} + \Delta COD\ \text{(biological solids)} \quad (b\ 2)$$

This balance represents the partition of the substrate between respiration and synthesis. The amount of COD which has been oxidized is represented by the accumulated oxygen uptake.

Rearranging Equation 2 and realizing that $\Delta COD$ (biological solids) equates to the COD of the waste biological sludge produced, the following simplified equation can be utilized, as shown:

$$O_2\ \text{uptake} = \Delta COD - COD\ \text{(waste sludge)} \quad (3)$$

Equation 3 should be used for thermophilic activated sludge type systems with solids/liquid separation and return sludge and waste sludge typical of conventional activated sludge systems. However, in once-through thermophilic systems, such as those treating low flow, high concentration wastes like slurries or particulate solids, all the waste sludge exits the reactor in the treated effluent. This operational approach simplifies the COD material balance to influent total COD minus effluent total COD equals the oxygen utilized, as shown:

$$O_2\ \text{uptake} = \text{Influent COD} - \text{Effluent COD} \quad (4)$$

or $$O_2\ \text{uptake} = \Delta COD \quad (5)$$

This very simple energy balance approach using oxygen equivalents provides an easy and reliable methodology for estimating oxygen utilization requirements in thermophilic aerobic treatment systems.

The COD material balance methodology provides the ideal approach for estimating oxygen uptake requirements in thermophilic aerobic treatment systems. The increase in biological solids or waste biological solids from industrial or municipal biological wastewater treatment systems can be expressed in terms of oxygen equivalents (COD), either by direct measurement or calculation. One of the major applications of the present process is anticipated to be digestion treatment or stabilization of these wastewater treatment plant waste biological solids. These biological solids are typically measured as total solids (TS) along with determination of the volatile fraction or volatile solids (VS). Using an empirical formula for the waste sludge or biological cells as measured by VS, the oxygen required to oxidize the VS completely to $CO_2$ and $H_2O$ can be calculated, thus providing the theoretical COD of the biological sludge. The empirical formula employed below in the balanced equation for total oxidation can therefore be used to calculate oxygen requirements, as shown:

$$C_5H_7NO_2 + 5O_2 \rightarrow 5CO_2 + 2H_2O + NH_3 \tag{6}$$

The ratio of combining the weights for the biological cells and oxygen is equal to 1.42; thus each milligram of biological solids is equivalent to 1.42 milligrams of oxygen, or the calculated COD of the biological cells equals 1.42 times the dry weight of the cells measured as volatile solids. Therefore, oxygen equivalents or oxygen utilization rates can be determined by either COD and/or VS measurements.

High field oxygen transfer efficiencies have been observed in the process of the present invention. In addition to exhibiting excellent oxygen transfer performance, the aerobic thermophilic process possess other desirable characteristics, such as; high operating temperatures, high oxygen utilization rates, tendency to foam, and high total dissolved solids (TDS) concentrations. In air operated systems, evaporation losses account for a significant reduction in the bulk liquid volume treated along with associated increases in the inorganic TDS concentrations. The reduction in surface tension, in conjunction with high TDS concentrations, along with the previously discussed factors impacting oxygen transfer in thermophilic systems all have positive beneficial impacts on field oxygen transfer performance in the aerobic thermophilic treatment process at high temperatures.

Oxygen transfer in wastewater treatment involves the absorption of gas (oxygen) by a liquid whereby the physical mass transport across a two-film layer consists of a gas film and a liquid film. The oxygen transfer rate can be expressed by the following equation:

$$N = K_L A (C_S - C_1) \tag{7}$$

where:
N=Mass of oxygen transferred per unit time.
$K_L$=Liquid film mass transfer coefficient.
A=Interfacial area per unit volume.
$C_S$=Saturation concentration of oxygen at the gas/liquid interface.
$C_1$=Concentration of oxygen in the bulk liquid.

The value $K_{LA}$ is considered as the overall mass transfer coefficient and includes the liquid film coefficient and the interfacial area per unit volume. The "combined" coefficient is used because it is impractical to measure the liquid film coefficient or the interfacial area. The overall oxygen transfer process has been hypothesized to occur in three phases, as follows:

A. Transfer of oxygen molecules to the liquid surface resulting in an equilibrium or saturation condition at the gas/liquid interface.

B. The passing of oxygen molecules through the liquid film into solution by molecular diffusion.

C. Mixing of oxygen in the bulk liquid by diffusion and convection.

Aeration equipment is typically rated by the oxygen transfer efficiency in clean water (SOTR), assuming 0.0 mg/l dissolved oxygen, 1.0 atmosphere pressure, and a temperature of 20° C. To translate from standard conditions to field process conditions the following equation is used:

$$AOR = SOR\alpha \left[ \frac{((\beta C_{walt} D_C) - C_L)}{(C_{20} D_C)} \right] \theta^{(T_W - 20)} \tag{8}$$

where:
AOR=Actual (Process) Oxygen Requirement (lb/hr).
SOR=Standard Oxygen Requirement (lb/hr).
α(Alpha)=Ratio of oxygen transfer coefficient ($K_{LA}$) of the wastewater to that of tap water.
β(Beta)=Ratio of oxygen saturation of the wastewater to that of tap water.
$C_{wait}$=Surface saturation dissolved oxygen concentration in clean water at the wastewater temperature ($T_w$) and basin elevation, mg/l.
$D_C$=Depth Correction Factor, Dc=Water Depth (ft)/100+1.
$C_L$=Residual Dissolved Oxygen concentration, mg/l.
$C_{20}$=Surface saturation dissolved oxygen concentration of air in clean water at 20° C. and 760 mm Hg (9.09 mg/l).
θ(Theta)=Temperature correction coefficient.
$T_W$=Wastewater temperature (°C).

Wastewater contaminants, temperature, dissolved oxygen concentration, type of aeration device, and turbulence all affect oxygen transfer rate. The three parameters that account for the impact of these influences on oxygen transfer are alpha (α), beta (β), and theta (θ).

Alpha (α), the ratio of process water to clean water volumetric mass transfer coefficient, is different for different types of aeration devices. The impact of wastewater contaminants can be attributed to dissolved salts (inorganic TDS) and surface active agents. The calculation of alpha is represented by the following equation:

$$\alpha = \frac{K_{LA} \text{ wastewater}}{K_{LA} \text{ clean water}} \tag{9}$$

where:
α=Alpha.
$K_{LA}$ wastewater=Overall mass transfer coefficient of wastewater.
$K_{LA}$ clean water=Overall mass transfer coefficient of clean water.

Beta (β) is defined as the ratio of the saturation dissolved oxygen concentration of actual wastewater to that in clean water. Temperature, barometric pressure, and dissolved solids are the key variables that affect the appropriate beta value. The aeration device is not considered to have an impact on the beta factor. The calculation of beta is represented by the following equation:

$$\beta = \frac{C_{wastewater}}{C_{clean\,water}} \tag{10}$$

where:
β=Beta.
$C_{wastewater}$=Saturation concentration of oxygen in wastewater, mg/l.

$C_{clean\ water}$=Saturation concentration of oxygen in clean water, mg/l.

The Theta (θ) factor is used to relate the overall mass transfer coefficient at a specific temperature (typically standard conditions, 20° C.) to that at a different temperature. Temperature strongly affects aeration in a variety of ways. The greatest effect is on saturation dissolved oxygen concentration. The effect of saturation levels is not included in the theta factor, but handled in the conversion equation from SOR to AOR. Temperature correction of the mass transfer coefficient is achieved by applying the following equation:

$$K_{LAT}=K_{LA20}\theta_G^{(T-20)} \qquad (11)$$

where:

$K_{LAT}$=Mass transfer coefficient at temperature, T.

$K_{LA20}$=$K_{LAT}$ corrected to Standard Conditions (Barometric Pressure=1 atm, water temperature 20° C.).

$\theta_G$=Geometric temperature correction coefficient, Theta.

T=Process water temperature, °C.

The correction for the effect of temperature is empirical and attempts to lump all possible factors influencing the transfer coefficient, such as viscosity, surface tension, diffusivity of oxygen, etc.

Proper aeration and mixing with the appropriate reactor design are the two most important physical design factors impacting the present process. The dissolved oxygen saturation concentration in the bulk liquid decreases with increasing temperature, thus lowering the driving force for oxygen transfer into the bulk liquid in a thermophilic reactor. However, the oxygen transfer increases as the liquid temperature increases and the oxygen uptake rate increases. Therefore, the oxygen uptake rate is proportional to both the overall oxygen mass transfer coefficient ($K_{LA}$) and the actual deficit, such that these two effects cancel each other out and high oxygen transfer efficiencies are achieved at the high thermophilic reaction temperatures. The oxygen utilization efficiencies are significantly enhanced in the high temperature thermophilic systems encouraging high field oxygen transfer efficiencies. Strong relationships exist between aeration, mixing, temperature, COD and/or VS concentration/loading rate, COD and/or VS destruction rate, hydraulic retention time, viscosity, and amount and type of foaming. The foam layer improves oxygen utilization and thus oxygen tansfer, enhances biological activity, and provides insulation, but it retards air flow. The foam layer is important, but it must be controlled by densification (breaking large foam bubbles into small bubbles) to form a compact layer above the liquid surface of the reactor. A highly efficient aeration oxygen transfer system is required to keep up with the extremely high oxygen utilization demand, to minimize the latent heat loss from the reactor that occurs in the air exhausted from the reactor, and to minimize energy requirements. Both the air or oxygen flow rate and oxygen transfer efficiency depend on the reactor design geometry, turbulence and mixing conditions and organic carbon source characteristics (soluble, particulate, viscosity, etc.).

The aerobic thermophilic treatment process can be used on hot wastes, or on wastes that provide enough fuel value for autoheating. In order to accomplish autoheating, adequate carbon source measured as COD or VS must be supplied to the process. The organic carbon loading can be supplied in either soluble COD form or particulate VS or COD form. One of the major advantages of the thermophilic process compared to the mesophilic process is minimal biomass production or sludge yield which equates to maximum heat generation. Biological heat production as high as 6,300 BTU/lb oxygen utilized has been observed. In terms of biological volatile solids with an oxygen equivalent of 1.42 lbs °/lb VS treated, this equates to about 9,000 BTU/lb VS destroyed. Therefore, if the VS or COD loading rates are high enough and proper precautions are designed into the treatment system to manage heat loss, the thermophilic treatment processes can be equally effective for treatment/stabilization of biological waste sludges or high strength industrial waste (liquid or solids) residuals. The general requirements to maintain appropriate thermophilic temperatures includes sufficient biodegradable organics (VS or COD) to provide heat of oxidation up to 25 to 30 Kcal/liter, an insulated reactor, and adequate mixing and oxygen transfer efficiency to minimize excessive heat loss.

Exact predictions of reactor temperature must be based on material and energy balances with the specific reactor system. A heat release of 1.0 Kcal will raise the temperature of 1.0 liter of water 1.0° C. Heat production from organic material biodegradation and the associated microbiological growth is closely related to the biomass yield coefficient of a given process. Biomass yield minimization results in maximum heat generation while biomass yield maximization results in minimum heat generation. In order to achieve the critically important objective of autothermal operation, heat production must be maximized and biomass generation minimized. The heat balance in autothermal processes is critical to both effective and economical system operation. Therefore, the key to autothermal process operation is the employment of closed insulated reactors for controlled heat loss where sufficient heat generation is achieved by maintaining appropriate organic loading rates and microbiological or biokinetic reaction rates. Therefore, a key process objective of the aerobic thermophilic process of the present invention is to minimize biomass yield which maximizes both heat production and $CO_2$ production. Foam control is also essential because the foam provides an insulating blanket on top of the reactor, as well as improving oxygen utilization and enhancing biological activity. Efficient aeration oxygen transfer equipment is essential if the latent heat loss in the water vapor is to be maintained at an acceptable level. Evaporation losses can account for significant reductions in liquid volume, as well as increases in heat loss in air operated systems.

A key to successful apparatus design and process operation for the present invention is matching the number of microorganisms in the system to the organic substrate loading rate (COD or VS) of the system, or controlling the F/M ratio. Accurate prediction and modeling of treatment performance has been accomplished when substrate utilization is expressed as a function of the mass substrate loading ratio (F/M) by monomolecular kinetics for the suspended growth thermophilic treatment system. Extensive evaluation of recent testing for aerobic thermophilic reactors of the present invention has shown that these systems comply with the same types of kinetic relationships previously developed by the inventor for description of mesophilic aerobic and anaerobic suspended growth systems.

Extensive studies with thermophilic biological reactors by the inventor have shown that the relationships of substrate removal versus substrate applied were applicable to thermophilic systems. This analysis has allowed the development of mathematical models based on the experimental determination of biological kinetic constants describing substrate removal to be applied to design and operation of the aerobic thermophilic reactors of the present invention. The mathematical models and application methodology, along with data from bench scale, pilot scale and full scale operating systems have been evaluated by the inventor. These models are used for the design and operation of the present aerobic thermophilic processes. The kinetics of substrate removal in thermophilic treatment systems have been found to be dependent and predictable as a function of the mass substrate loading or application rate.

When considering the volume of the aerobic thermophilic reactor, a mass balance of substrate into and out of the reactor volume can be made as follows:

| Mass of substrate into the reactor | = | Mass of substrate out of the reactor | + | Mass of substrate consumed biologically | (12) |

In the case of the aerobic thermophilic reactor, the reactor volume is expressed in million gallons or cubic meters with the resultant mass balance equation:

$$FS_i = FS_e + \left(\frac{dS}{dt}\right)_G V \quad (13)$$

where:

F=Flow rate, MGD (m³/day).

$S_i$=Influent substrate concentration, mg/l.

$S_e$=Effluent substrate concentration, mg/l.

V=Reactor volume in million gallons (cubic meters).

$(dS/dt)_G$=Substrate utilization rate, lbs substrate/day/lb reactor volatile suspended solids (Kgs substrate/day/Kg reactor volatile suspended solids).

Mathematical description of this substrate utilization rate as a function of the substrate loading rate or F/M ratio based on monomolecular kinetics follows:

$$\left(\frac{dS}{dt}\right)_G = \frac{U_{max} X \frac{FS_i}{XV}}{K_B + \frac{FS_i}{XV}} \quad (14)$$

where:

X=Reactor mixed liquor volatile suspended solids concentration, mg/l.

$FS_i/XV$=Mass substrate loading rate, lbs substrate/day/lb reactor volatile suspended solids (Kgs substrate/day/Kg reactor volatile suspended solids).

$U_{max}$=Maximum specific substrate utilization rate, lbs substrate/day/lb reactor volatile suspended solids (Kgs substrate/day/Kg reactor volatile suspended solids).

$K_B$=Proportionality constant or substrate loading at which the rate of substrate utilization is one-half the maximum rate, lbs substrate/day/lb reactor volatile suspended solids (Kgs substrate/day/Kg reactor volatile suspended solids).

Substitution of Equation 14 into Equation 13 and solving for the reactor volume, V or the effluent quality, $S_e$, provides the design equation or the effluent quality predictive equation to be used for operation, respectively. The kinetic constants, $U_{max}$ and $K_B$, are determined experimentally.

The formula for the specific substrate utilization rate is as follows:

$$U = \frac{1}{X}\left(\frac{dS}{dt}\right)_G \quad (15)$$

or $$U = \frac{F(S_i - S_e)}{XV} \quad (16)$$

where

U=Specific substrate utilization rate, lbs substrate/day/lb reactor volatile suspended solids (Kgs substrate/day/Kg reactor volatile suspended solids).

The specific substrate utilization rate (U) is plotted as a function of the specific substrate loading rate or mass substrate loading rate. Then the reciprocal of U is plotted as a function of the reciprocal of the mass loading rates. $U_{max}$ is the reciprocal of the Y-axis intercept, and the slope of the line is equal to $K_S/U_{max}$.

It is important during start-up and operation of the aerobic thermophilic reactor 10 to acclimate and stabilize the reactor vessel 12 with thermophilic microorganisms. The thermophilic biological solids inventory is increased by gradually increasing the flow of waste material, and thus the organic loading rate (COD and/or VS), to the reactor vessel 12. It is important to increase the organic loadings and decrease the hydraulic retention times as the temperature of the bulk liquid in the reactor vessel 12 increases in proportion to the quantity of thermophilic biomass in order to control the food-to-microorganism (F/M) ratio and biological solids retention time in the reactor. This aspect of both reactor start-up and stabilized operations can be monitored by the previously described critical parameters. Adjustments are required when any of the parameters exceed pre-set acceptable operating ranges.

In summary, the present invention provides an aerobic thermophilic treatment process coupled with a novel reactor design to offer significant advantages, compared with the prior art, in terms of treatment performance, process optimization, biogas and offgas quality, and capabilities to treat complex, inhibitory, and difficult to treat industrial wastes.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed and as defined in the appended claims.

What is claimed is:

1. An aerobic thermophilic process for treating waste comprising:

injecting waste material into a reactor vessel having thermophilic microorganism to form a volume of bulk liquid in the reactor vessel;

injecting an oxygen-containing gas into the reactor vessel in such manner as to transfer oxygen into the reactor bulk liquid for utilization by the thermophilic microorganisms in aerobic treatment of the waste material;

monitoring the oxidation-reduction potential and temperature of the reactor bulk liquid;

monitoring the concentration of volatile fatty acids and sulfides in the reactor bulk liquid; and adjusting at least a selected one of the rate of injection of the oxygen-containing gas, the oxygen-transfer efficiency of the oxygen-containing gas and the volume of bulk liquid in the reactor in response to the concentration of volatile fatty acids, concentration of sulfides, oxidation-reduction potential and temperature of the reactor bulk liquid to maintain the temperature of the reactor bulk liquid within a predetermined range.

2. An aerobic thermophilic process for treating waste comprising:

injecting waste material into a reactor vessel having thermophilic microorganisms to form a volume of bulk liquid in the reactor vessel;

injecting an oxygen-containing gas into the reactor vessel in such manner as to transfer oxygen into the reactor bulk liquid for utilization by the thermophilic microorganisms in aerobic treatment of the waste material;

monitoring the oxidation-reduction potential and temperature of the reactor bulk liquid;

monitoring the concentration of volatile fatty acids and sulfides in the reactor bulk liquid;

removing offgas from the reactor vessel;

monitoring the concentration of oxygen, hydrogen sulfide and carbon dioxide in the offgas; and adjusting at least a selected one of the rate of injection of the oxygen-containing gas, the oxygen-transfer efficiency of the oxygen-containing gas and the volume of bulk liquid in the reactor in response to the concentrations of oxygen, hydrogen sulfide and carbon dioxide in the offgas, and in response to the concentration of volatile fatty acids, concentration of sulfides, oxidation-reduction potential and temperature of the reactor bulk liquid to maintain the temperature of the reactor bulk liquid within a predetermined range.

3. An aerobic thermophilic process for treating waste comprising:

injecting waste material into a reactor vessel having thermophilic microorganisms to form a volume of bulk liquid in the reactor vessel;

injecting an oxygen-containing gas into the reactor vessel in such manner as to transfer oxygen into the reactor bulk liquid for utilization by the thermophilic microorganisms in aerobic treatment of the waste material;

monitoring the oxidation-reduction potential and temperature of the reactor bulk liquid;

monitoring the concentration of volatile fatty acids and sulfides in the reactor bulk liquid;

removing offgas from the reactor vessel;

monitoring the concentration of oxygen, hydrogen sulfide and carbon dioxide in the offgas;

monitoring the levels of alkalinity, COD, TS, VS, $NH_3$—N and $PO_4$—P for the process; and adjusting at least a selected one of the rate of injection of the oxygen-containing gas, the oxygen-transfer efficiency of the oxygen-containing gas and the volume of bulk liquid in the reactor in response to the concentrations of oxygen, hydrogen sulfide and carbon dioxide in the offgas, and in response to the alkalinity, COD, TS, VS, $NH_3$—N, $PO_4$—P, concentration of volatile fatty acids, concentration of sulfides, oxidation-reduction potential and temperature of the reactor bulk liquid to maintain the temperature of the reactor bulk liquid within a predetermined range.

4. An aerobic thermophilic process for treating waste comprising:

injecting waste material into a reactor vessel having thermophilic microorganisms to form a volume of bulk liquid in the reactor vessel;

injecting an oxygen-containing gas into the reactor vessel in such manner as to transfer oxygen into the reactor bulk liquid for utilization by the thermophilic microorganisms in aerobic treatment of the waste material;

monitoring the oxidation-reduction potential and temperature of the reactor bulk liquid;

monitoring the concentration of volatile fatty acids and sulfides in the reactor bulk liquid; and adjusting at least a selected one of the rate of injection of the oxygen-containing gas, the oxygen-transfer efficiency of the oxygen-containing gas and the volume of bulk liquid in the reactor in response to the concentration of volatile fatty acids, concentration of sulfides, oxidation-reduction potential and temperature of the reactor bulk liquid to maintain the temperature of the reactor bulk liquid within a predetermined range.

5. An aerobic thermophilic process for treating waste comprising:

injecting waste material into a reactor vessel having thermophilic microorganisms to form a volume of bulk liquid in the reactor vessel;

injecting an oxygen-containing gas into the reactor vessel in such manner as to transfer oxygen into the reactor bulk liquid for utilization by the thermophilic microorganisms in aerobic treatment of the waste material;

monitoring the oxidation-reduction potential and temperature of the reactor bulk liquid;

monitoring the concentration of volatile fatty acids and sulfides in the reactor bulk liquid;

removing offgas from the reactor vessel;

monitoring the concentration of oxygen, hydrogen sulfide and carbon dioxide in the offgas; and adjusting at least a selected one of the rate of injection of the oxygen-containing gas, the oxygen-transfer efficiency of the oxygen-containing gas and the volume of bulk liquid in the reactor in response to the concentrations of oxygen, hydrogen sulfide and carbon dioxide in the offgas, and in response to the concentration of volatile fatty acids, concentration of sulfides, oxidation-reduction potential and temperature of the reactor bulk liquid to maintain the temperature of the reactor bulk liquid within a predetermined range.

6. An aerobic thermophilic process for treating waste comprising:

injecting waste material into a reactor vessel having thermophilic microorganisms to form a volume of bulk liquid in the reactor vessel;

injecting an oxygen-containing gas into the reactor vessel in such manner as to transfer oxygen into the reactor bulk liquid for utilization by the thermophilic microorganisms in aerobic treatment of the waste material;

monitoring the oxidation-reduction potential and temperature of the reactor bulk liquid;

monitoring the concentration of volatile fatty acids and sulfides in the reactor bulk liquid;

removing offgas from the reactor vessel;

monitoring the concentration of oxygen, hydrogen sulfide and carbon dioxide in the offgas;

monitoring the levels of alkalinity, COD, TS, VS, $NH_3$—N and $PO_4$—P for the process; and adjusting at least a selected one of the rate of injection of the oxygen-containing gas, the oxygen-transfer efficiency of the oxygen-containing gas and the volume of bulk liquid in the reactor in response to the concentrations of oxygen, hydrogen sulfide and carbon dioxide in the offgas, and in response to the alkalinity, COD, TS, VS, $NH_3$—N, $PO_4$—P, concentration of volatile fatty acids, concentration of sulfides, oxidation-reduction potential and temperature of the reactor bulk liquid to maintain the temperature of the reactor bulk liquid within a predetermined range.

* * * * *

UNITED STATES PATENT AND TRADEMARK OFFICE
CERTIFICATE OF CORRECTION

PATENT NO : 6,036,862
DATED : March 14, 2000
INVENTOR(S) : ENOS L. STOVER

It is certified that error appears in the above-identified patent and that said Letters Patent are hereby corrected as shown below:

On title page, item 54 Title of Patent
replace "BIOCHEMICALLY ENCHANCED THERMOPHILIC TREATMENT PROCESS" with --BIOCHEMICALLY ENHANCED THERMOPHILIC TREATMENT PROCESS--.

Col. 1, line 1
replace "BIOCHEMICALLY ENCHANCED" with --BIOCHEMICALLY ENHANCED--.

Signed and Sealed this

Twenty-fourth Day of April, 2001

Attest:

NICHOLAS P. GODICI

Attesting Officer

Acting Director of the United States Patent and Trademark Office